(12) United States Patent
Simonetti et al.

(10) Patent No.: US 12,259,194 B2
(45) Date of Patent: Mar. 25, 2025

(54) THERMAL MANAGEMENT SYSTEM

(71) Applicant: General Electric Company, Schenectady, NY (US)

(72) Inventors: Michael Simonetti, Liberty Township, OH (US); Michael Vadnais, Milwaukee, WI (US); Nishita Deshmukh, Bengaluru (IN); Ramana Reddy Kollam, Bengaluru (IN); James Fitzgerald Bonar, Cincinnati, OH (US); Mehmet Kilic, Kacaeli (TR); Prerna Mandal, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/349,415

(22) Filed: Jul. 10, 2023

(65) Prior Publication Data
US 2025/0027721 A1    Jan. 23, 2025

(51) Int. Cl.
*F28D 7/16* (2006.01)
*F28D 21/00* (2006.01)

(52) U.S. Cl.
CPC ...... *F28D 7/163* (2013.01); *F28D 2021/0021* (2013.01); *F28D 2021/0026* (2013.01)

(58) Field of Classification Search
CPC ............ F28D 7/163; F28D 2021/0021; F28D 2021/0026; F05D 2260/20; F05D 2260/213; F02C 7/12; F02C 7/14; F02C 7/185
See application file for complete search history.

(56) References Cited

U.S. PATENT DOCUMENTS

| 1,963,906 | A | 6/1934 | Jaffe |
| 2,181,927 | A | 12/1939 | Townsend |
| 2,343,542 | A | 3/1944 | Faunce |
| 2,479,071 | A | 8/1949 | Henstridge |

(Continued)

FOREIGN PATENT DOCUMENTS

| DE | 102005049067 A1 | 4/2007 |
| EP | 0777094 A2 | 6/1997 |

(Continued)

OTHER PUBLICATIONS

Naderi et al., Design and Performance Characterization of a Micro-pin-fin sCO2 Recuperator, Supercritical CO2 Power Cycles Symposium, Mar. 29, 2018, Pittsburg, 20 Pages. http://sco2symposium.com/papers2018/heat-exchangers/159_Pres.pdf.

*Primary Examiner* — Loren C Edwards
(74) *Attorney, Agent, or Firm* — Dority & Manning, P.A.

(57) ABSTRACT

A gas turbine engine is provided. The gas turbine engine includes: a thermal management system having a thermal fluid member having a flow of thermal fluid therethrough during operation of the gas turbine engine and a heat exchanger assembly, the heat exchanger assembly including: a core section comprising a plurality of heat exchange members; and a heat exchange manifold including a first direction pressure vessel in fluid communication with the thermal fluid member and a second direction pressure vessel extending from the first direction pressure vessel, the first and second direction pressure vessels each extending in a reference plane, the second direction pressure vessel in fluid communication with the first direction pressure vessel and with at least one of the plurality of heat exchange members.

20 Claims, 9 Drawing Sheets

(56) References Cited

U.S. PATENT DOCUMENTS

| | | |
|---|---|---|
| 2,872,165 A | 2/1959 | Wennerberg |
| 2,939,686 A | 6/1960 | Wildermuth |
| 3,072,225 A | 1/1963 | Cremer et al. |
| 3,161,234 A | 12/1964 | Rannenberg |
| 3,334,399 A | 8/1967 | Teeguarden |
| 3,528,250 A | 9/1970 | Johnson |
| 3,643,733 A | 2/1972 | Hall et al. |
| 3,735,588 A | 5/1973 | Moskowitz et al. |
| 3,757,855 A | 9/1973 | Kun et al. |
| 3,807,496 A | 4/1974 | Stadmark |
| 3,841,271 A | 10/1974 | Harris, Jr. et al. |
| 3,885,942 A | 5/1975 | Moore |
| 3,948,317 A | 4/1976 | Moore |
| 4,109,710 A | 8/1978 | Forster et al. |
| 4,137,705 A | 2/1979 | Andersen et al. |
| 4,211,208 A | 7/1980 | Lindner |
| 4,216,937 A | 8/1980 | Bridgnell et al. |
| 4,246,959 A | 1/1981 | Byrne |
| 4,253,520 A | 3/1981 | Friedericy et al. |
| 4,275,785 A | 6/1981 | Kerivan |
| 4,328,860 A | 5/1982 | Hoffmuller |
| 4,470,455 A | 9/1984 | Sacca |
| 4,503,908 A | 3/1985 | Rosman et al. |
| 4,596,285 A | 6/1986 | Dinulescu |
| 4,638,857 A | 1/1987 | Fournier |
| 4,676,303 A | 6/1987 | Barroyer et al. |
| 4,676,305 A | 6/1987 | Doty |
| 4,785,879 A | 11/1988 | Longsworth et al. |
| 4,815,532 A | 3/1989 | Sasaki et al. |
| 4,854,380 A | 8/1989 | Yoshida et al. |
| 4,880,055 A | 11/1989 | Niggemann et al. |
| 5,033,542 A | 7/1991 | Jabs |
| 5,123,242 A * | 6/1992 | Miller ................... F28F 27/02 60/39.83 |
| 5,243,815 A | 9/1993 | Maier et al. |
| 5,251,692 A | 10/1993 | Haussmann |
| 5,363,654 A | 11/1994 | Lee |
| 5,511,613 A | 4/1996 | Mohn et al. |
| 5,544,700 A | 8/1996 | Shagoury |
| 5,695,007 A | 12/1997 | Fauconnier et al. |
| 5,775,412 A | 7/1998 | Montestruc, III et al. |
| 5,810,077 A | 9/1998 | Nakamura et al. |
| 5,820,654 A | 10/1998 | Gottzman et al. |
| 5,987,877 A | 11/1999 | Steiner |
| 6,422,306 B1 | 7/2002 | Tomlinson et al. |
| 6,474,408 B1 | 11/2002 | Yeh et al. |
| 6,945,320 B2 | 9/2005 | Harvard, Jr. et al. |
| 7,185,483 B2 | 3/2007 | Czachor |
| 7,220,392 B2 | 5/2007 | Rong et al. |
| 7,255,159 B2 | 8/2007 | Sagasser et al. |
| 7,343,965 B2 | 3/2008 | Memory et al. |
| 7,377,100 B2 | 5/2008 | Bruno et al. |
| 7,575,793 B2 | 8/2009 | Aniolek et al. |
| 7,650,935 B2 | 1/2010 | Demuth et al. |
| 7,779,898 B2 | 8/2010 | Morrison et al. |
| 7,784,528 B2 | 8/2010 | Ottow et al. |
| 7,861,512 B2 | 1/2011 | Olver et al. |
| 7,866,377 B2 | 1/2011 | Slaughter |
| 8,266,888 B2 | 9/2012 | Liu |
| 8,266,889 B2 | 9/2012 | Coffinberry |
| 8,353,330 B2 | 1/2013 | Lim et al. |
| 8,381,803 B2 | 2/2013 | Kim et al. |
| 8,522,521 B2 | 9/2013 | Dyer |
| 8,708,036 B2 | 4/2014 | Ikeda |
| 8,826,970 B2 | 9/2014 | Shiraichi et al. |
| 9,249,730 B2 | 2/2016 | Bourassa et al. |
| 9,599,379 B2 | 3/2017 | Ha et al. |
| 9,752,835 B2 | 9/2017 | Waldman et al. |
| 9,777,963 B2 | 10/2017 | Martinez et al. |
| 9,835,380 B2 | 12/2017 | Kupiszewski et al. |
| 10,006,369 B2 | 6/2018 | Kupiszewski |
| 10,175,003 B2 | 1/2019 | Sennoun et al. |
| 10,247,324 B2 | 4/2019 | Magee |
| 10,378,835 B2 | 8/2019 | Kenworthy et al. |
| 10,502,502 B2 | 12/2019 | Sennoun et al. |
| 10,634,054 B2 | 4/2020 | Schmitz |
| 10,670,349 B2 | 6/2020 | Wilson et al. |
| 10,809,007 B2 | 10/2020 | Martinez et al. |
| 10,821,509 B2 | 11/2020 | Manteiga et al. |
| 10,830,540 B2 | 11/2020 | Sennoun et al. |
| 11,371,786 B2 | 6/2022 | Johns |
| 2002/0005275 A1 | 1/2002 | O'Donnell et al. |
| 2003/0131978 A1 | 7/2003 | Nakano |
| 2003/0159807 A1 | 8/2003 | Ayres et al. |
| 2004/0069470 A1 | 4/2004 | Gorbulsky |
| 2005/0150970 A1 | 7/2005 | Beutin et al. |
| 2007/0240865 A1 | 10/2007 | Zhang et al. |
| 2008/0014528 A1 | 1/2008 | Bailey et al. |
| 2008/0095611 A1 | 4/2008 | Storage et al. |
| 2008/0149313 A1 | 6/2008 | Slaughter |
| 2009/0260786 A1 | 10/2009 | Palanchon |
| 2010/0012289 A1 | 1/2010 | Haussmann |
| 2010/0077794 A1 | 4/2010 | Higashiyama et al. |
| 2010/0239793 A1 | 9/2010 | Andrews et al. |
| 2011/0024093 A1 | 2/2011 | Shiraichi et al. |
| 2011/0056652 A1 | 3/2011 | Neher et al. |
| 2011/0180242 A1 | 7/2011 | Urata et al. |
| 2012/0074150 A1 | 3/2012 | Wortmann et al. |
| 2012/0141851 A1 | 6/2012 | Hou et al. |
| 2012/0180478 A1 | 7/2012 | Johnson et al. |
| 2012/0279242 A1 | 11/2012 | Seybold et al. |
| 2012/0312502 A1 | 12/2012 | Metni et al. |
| 2013/0020047 A1 | 1/2013 | Army, Jr. et al. |
| 2013/0075054 A1 | 3/2013 | Fox et al. |
| 2013/0140010 A1 | 6/2013 | Parfenov |
| 2013/0152989 A1 | 6/2013 | Krinn et al. |
| 2013/0180696 A1 | 7/2013 | Magee et al. |
| 2013/0236299 A1 | 9/2013 | Kington et al. |
| 2014/0027099 A1 | 1/2014 | Sispera et al. |
| 2014/0034028 A1 | 2/2014 | Zhang et al. |
| 2014/0116664 A1 | 5/2014 | Landre |
| 2014/0150735 A1 | 6/2014 | Caruzzi et al. |
| 2014/0154548 A1 | 6/2014 | Dillmann et al. |
| 2014/0166236 A1 | 6/2014 | Tan et al. |
| 2014/0208768 A1 | 7/2014 | Bacic |
| 2014/0328964 A1 | 11/2014 | Mark et al. |
| 2014/0360698 A1 | 12/2014 | Waldman et al. |
| 2015/0027669 A1 | 1/2015 | Kokas et al. |
| 2015/0053380 A1 | 2/2015 | Army, Jr. et al. |
| 2015/0101334 A1 | 4/2015 | Bond et al. |
| 2015/0114611 A1 | 4/2015 | Morris et al. |
| 2015/0129184 A1 | 5/2015 | Alhazmy |
| 2015/0168080 A1 | 6/2015 | Honma et al. |
| 2015/0176924 A1 | 6/2015 | Hu et al. |
| 2015/0192370 A1 | 7/2015 | Suzuki et al. |
| 2015/0241142 A1 | 8/2015 | Vallee et al. |
| 2015/0377135 A1 | 12/2015 | Kupiszewski |
| 2015/0377562 A1 | 12/2015 | Buckrell et al. |
| 2016/0010863 A1 | 1/2016 | Ott et al. |
| 2016/0108814 A1 | 4/2016 | Schmitz |
| 2016/0108815 A1 | 4/2016 | Schmitz et al. |
| 2016/0109130 A1 | 4/2016 | Stastny et al. |
| 2016/0116218 A1 | 4/2016 | Shedd et al. |
| 2016/0116222 A1 | 4/2016 | Shedd et al. |
| 2016/0131432 A1 | 5/2016 | Neumann et al. |
| 2016/0151860 A1 | 6/2016 | Engeli et al. |
| 2016/0175934 A1 | 6/2016 | Lacy et al. |
| 2016/0201998 A1 | 7/2016 | Kennedy et al. |
| 2016/0202003 A1 | 7/2016 | Gerstler et al. |
| 2016/0230595 A1 | 8/2016 | Wong et al. |
| 2016/0265850 A1 | 9/2016 | Kupiszewski et al. |
| 2016/0305713 A1 | 10/2016 | Grande Fernandez et al. |
| 2016/0363387 A1 | 12/2016 | Stapleton |
| 2017/0205149 A1 | 7/2017 | Herring et al. |
| 2018/0244127 A1 | 8/2018 | Sennoun et al. |
| 2019/0003390 A1* | 1/2019 | Ramos .................... F02C 7/14 |
| 2019/0024921 A1* | 1/2019 | Wilson ................ F28F 9/0214 |
| 2019/0120562 A1 | 4/2019 | Fuller |
| 2022/0373263 A1 | 11/2022 | Wiedenhoefer et al. |

FOREIGN PATENT DOCUMENTS

| | | |
|---|---|---|
| EP | 1098156 A1 | 5/2001 |
| EP | 2088371 A2 | 8/2009 |

(56) References Cited

FOREIGN PATENT DOCUMENTS

| | | | |
|---|---|---|---|
| GB | 400557 | A | 10/1933 |
| GB | 2217828 | A | 11/1989 |
| JP | H11325753 | A | 11/1999 |
| JP | 20010141674 | A | 2/2001 |
| JP | 2004037020 | A | 2/2004 |
| JP | 2006002622 | A | 1/2006 |
| RU | 2535187 | C1 | 12/2014 |

* cited by examiner

|   | $\dfrac{Dh_{Offtake\_Inlet\_Avg}}{Dh_{Offtake\_Exit\_Avg}}$ | $\dfrac{Dh_{Plenum\_Inlet\_Avg}}{Dh_{Plenum\_Exit\_Avg}}$ | $\dfrac{L_{Plenum\_Avg}}{L_{Offtake\_Avg}}$ | HDR |
|---|---|---|---|---|
| 1 | 0.284 | 0.392 | 0.497 | 0.055 |
| 2 | 0.923 | 1.054 | 1.248 | 1.214 |
| 3 | 2.533 | 1.014 | 1.300 | 3.339 |
| 4 | 2.424 | 3.324 | 1.601 | 12.899 |
| 5 | 0.058 | 0.114 | 0.417 | 0.003 |
| 6 | 2.127 | 0.261 | 3.010 | 1.674 |
| 7 | 3.205 | 2.109 | 1.577 | 10.660 |
| 8 | 11.015 | 18.385 | 1.862 | 377.155 |

| $\dfrac{Dh_{Offtake\_Inlet\_Avg} + Dh_{Offtake\_Exit\_Avg}}{2 \times T_{Rib\_Avg}}$ | $\dfrac{Dh_{Plenum\_Inlet\_Avg} + Dh_{Plenum\_Exit\_Avg}}{2 \times T_{Rib\_Avg}}$ | RTR |
|---|---|---|
| 1 | 1.090 | 0.902 | 0.984 |
| 2 | 1.600 | 3.246 | 5.194 |
| 3 | 2.474 | 3.403 | 8.418 |
| 4 | 5.128 | 6.012 | 30.833 |
| 5 | 0.685 | 0.461 | 0.315 |
| 6 | 3.988 | 2.926 | 11.668 |
| 7 | 5.414 | 5.984 | 32.400 |
| 8 | 18.913 | 19.804 | 374.561 |

THERMAL MANAGEMENT SYSTEM

FIELD

The present disclosure relates to a thermal management system having a heat exchanger assembly, such as a thermal management system for a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. Gas turbine engines generally include a thermal management system to manage thermal loads during operation of the gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
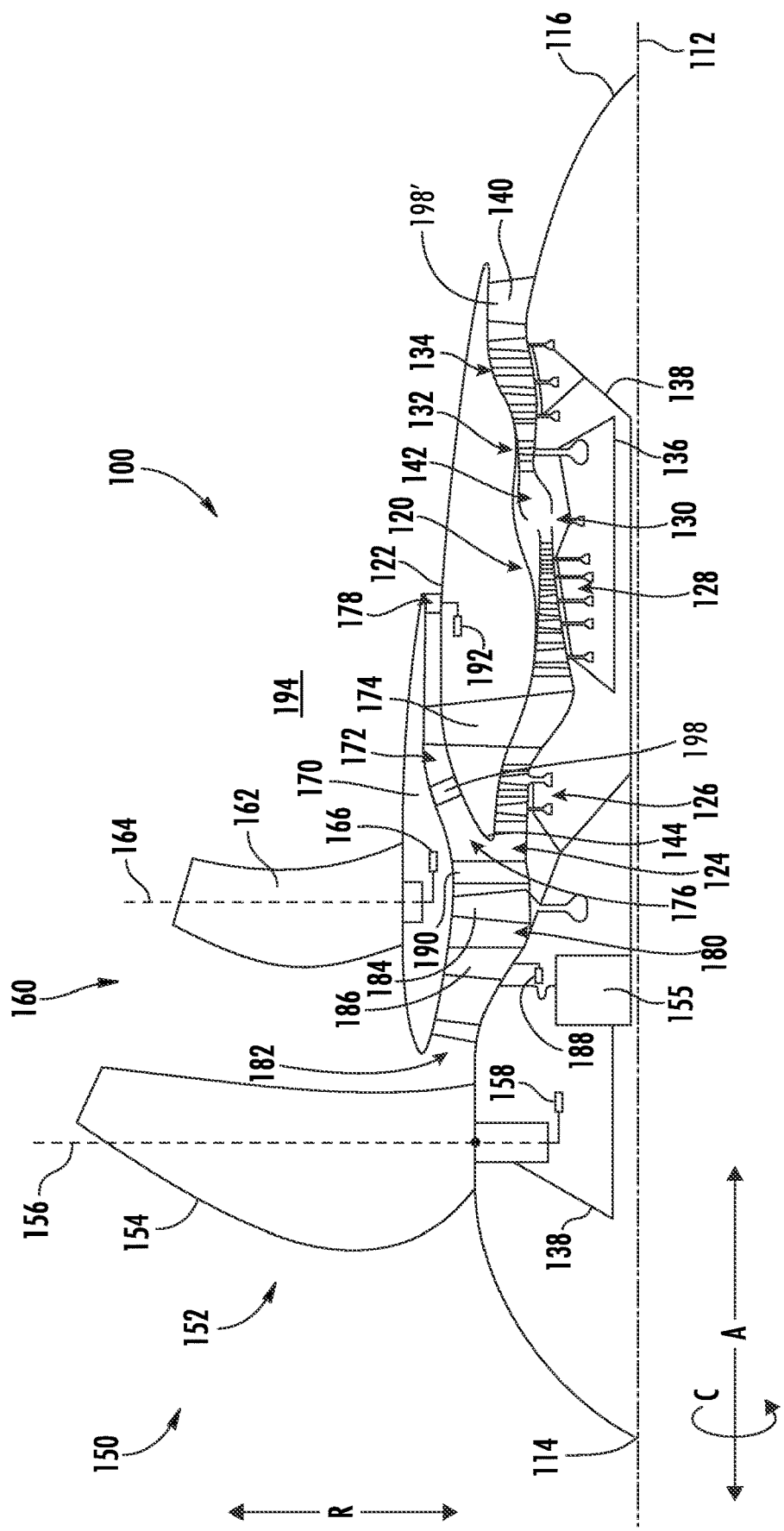
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

As used herein, the terms "first", "second", and "third" may be used interchangeably to distinguish one component from another and are not intended to signify location or importance of the individual components.

The term "adjacent" as used herein with reference to two like components refers to the components being separated only by dissimilar components.

As used herein, the term "monolithic" as used to describe a structure refers to the structure being formed integrally of a continuous material or group of materials with no seams, connections, joints, or the like. The monolithic structures described herein may be formed through additive manufacturing to have the described structure, or alternatively through a casting process, or other appropriate method.

As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

Generally, a turbofan engine includes a fan and a turbomachine, with the turbomachine rotating the fan to generate thrust. The turbomachine includes a compressor section, a combustion section, a turbine section, and an exhaust section and defines a working gas flowpath therethrough.

Within the turbofan engine, thermal management may be important to ensure the turbofan engine operates as desired, without allowing certain components to exceed temperature thresholds. For example, a thermal management system of the turbofan engine may operate to reduce a temperature of a lubrication oil (used, e.g., for various bearings and gears within the turbofan engine), a cooled cooling air, electronics systems, etc. during operation of the turbofan engine. The thermal management system may utilize a thermal fluid and heat exchanger to transfer heat from a heat source to a heat sink.

Generally, it is desirable to operate the thermal fluid and heat exchanger at a high pressure to enhance heat transfer properties of the thermal fluid and heat exchanger. However, in order to operate at high pressures, the heat exchanger traditionally requires a pressure vessel with substantial stringers between outflow passages to support the load created by the high pressures of the thermal fluid. Such a configuration may result in an undesirably high amount of pressure loss/pressure drop between the pressure vessel and the outflow passages, as well as a poor distribution of the thermal fluid due to a reduced access to the pressure vessel as a result of the substantial stringers. Previous thinking has been to increase a size of the pressure vessel to allow for access to the high pressure thermal fluid from additional outflow passages.

However, the inventors of the present disclosure found that such a design process can lead to an undesirably heavy and large pressure vessel, which, when the heat exchanger is utilized within a working gas flowpath of a turbofan engine, may create an undesirable blockage of an airflow through the working gas flowpath. The inventors of the present disclosure set out to design a heat exchanger for a thermal management system of a turbofan engine, or other gas turbine engine, to solve the above issues.

In particular, as will be explained in more detail with reference to the exemplary embodiments described herein, the inventors of the present disclosure discovered a heat exchanger assembly having a core section and a heat exchange manifold. The core section includes a plurality of heat exchange members, and the heat exchange manifold includes a first direction pressure vessel (or more specifically a plenum extension) and a second direction pressure vessel (or more specifically an offtake extension). The plenum extension is in fluid communication with a thermal fluid member of the turbofan engine, and the offtake extension is in fluid communication with the plenum extension and at least one of the plurality of heat exchange members of the core section. In certain embodiments, the heat exchanger assembly may include a plurality of plenum extensions, each in parallel fluid communication with the thermal fluid member (or in series fluid communication with the thermal fluid member, or both), as well as a plurality of offtake extensions, each in fluid communication with the one or more plenum extensions and with at least one of the plurality of heat exchange members.

As part of designing a heat exchanger, such as the heat exchanger briefly described above, the inventors of the present disclosure discovered, unexpectedly, that by including a plurality of pressure vessels (e.g., plenum extension(s) and offtake extension(s)) arranged as a network of extensions, instead of increasing a size of a single pressure vessel, a heat exchanger may be provided having a manifold with a reduced blockage of the working gas flowpath of the turbofan engine and with a reduced weight, while accommodating the desired high pressures and providing an improved thermal fluid distribution to the core section.

In particular, the inventors discovered during the course of designing several heat exchangers to be used with several engine architectures of varying thrust classes and mission requirements (including the heat exchangers and engines illustrated and described in detail herein), a relationship exists among a plenum hydraulic diameter ratio; an offtake hydraulic diameter ratio; and a plenum to offtake length ratio, whereby including a heat exchanger in accordance with one or more of the exemplary aspects taking into account this relationship may result in a net benefit to the overall engine design.

Additionally, in at least certain exemplary embodiments, the inventors of the present disclosure found that by including one or more ribs extending between adjacent offtake extensions, between adjacent plenum extensions, or both may provide an overall reduction in a size of the heat exchange manifold by providing additional strength to the components. Further, by limiting a size (or thickness) of the ribs, the ribs may be included without providing excessive blockage of a thermal fluid flow through the plenum and/or offtake extensions. With such configuration, the inventors of the present disclosure further found that a relationship exists between an average offtake hydraulic diameter to rib thickness; and an average plenum hydraulic diameter to rib thickness, whereby including a heat exchanger in accordance with one or more of the exemplary aspects taking into account this relationship may result in a net benefit to the overall engine design.

As noted, previous thinking was to instead include a single, high-volume pressure vessel to accommodate a desired thermal fluid pressure and distribution level.

With a goal of arriving at an improved turbofan engine capable of transferring a relatively high amount of heat from a high-pressure thermal fluid to a heat sink (e.g., a working gas footpath of the turbofan engine), the inventors proceeded in the manner of designing gas turbine engines having a heat exchanger with a variety of plenum hydraulic diameter ratios, offtake hydraulic diameter ratios, plenum to offtake length ratios, average offtake hydraulic diameter to rib thicknesses, and average plenum hydraulic diameter to rib thicknesses; checking an operability and thermal rejection characteristics of the designed gas turbine engine and heat exchanger; redesigning the gas turbine engine and heat exchanger to vary the noted parameters based on the impact on other aspects of the gas turbine engine; rechecking the operability and thermal rejection characteristics of the redesigned gas turbine engine and heat exchanger; etc. during the design of several different types of heat exchangers and gas turbine engines, including the heat exchangers and gas turbine engines described below.

Referring now to FIG. 1, a schematic cross-sectional view of a gas turbine engine, or "engine 100", is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R. and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees) (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The low pressure shaft 138 is coaxial with the high pressure shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., a working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the low pressure shaft 138. For the embodiments shown in FIG. 1, the fan 152 is coupled with the low pressure shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to the fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the high pressure compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the low pressure shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100 (e.g., another working gas flowpath of the engine 100).

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between the engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust. $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 198 are positioned in thermal communication with the fan duct 172. For example, one or more heat exchangers 198 are disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 198 may be an annular heat exchanger extending substantially 360 degrees in the fan duct 172 (e.g., at least 300 degrees, such as at least 330 degrees). In such a manner, the heat exchanger 198 may effectively utilize the air passing through the fan duct 172 to cool one or more systems of the engine 100 (e.g., lubrication oil systems, compressor bleed air, electrical components, etc.). The heat exchanger 198 uses the air passing through the fan duct 172 as a heat sink and correspondingly increases the temperature of the air downstream of the heat exchanger 198 and exiting the fan exhaust nozzle 178.

It will be appreciated, however, that the exemplary gas turbine engine 100 depicted in FIG. 1 is by way of example only. In other exemplary embodiments, the gas turbine engine 100 may have any other suitable configuration. For example, in other exemplary embodiments, the gas turbine engine 100 may be configured as a ducted gas turbine engine (e.g., including a nacelle surrounding the fan 152), may be a direct drive gas turbine engine (e.g., driving the fan 152 without use of a reduction gearbox 155), etc. Further, although the heat exchanger 198 is depicted positioned in the fan duct 172, in other exemplary embodiments, the gas turbine engine 100 may additionally or alternatively include a heat exchanger 198' in the exhaust nozzle 140, or at other suitable locations.

Figure 2:
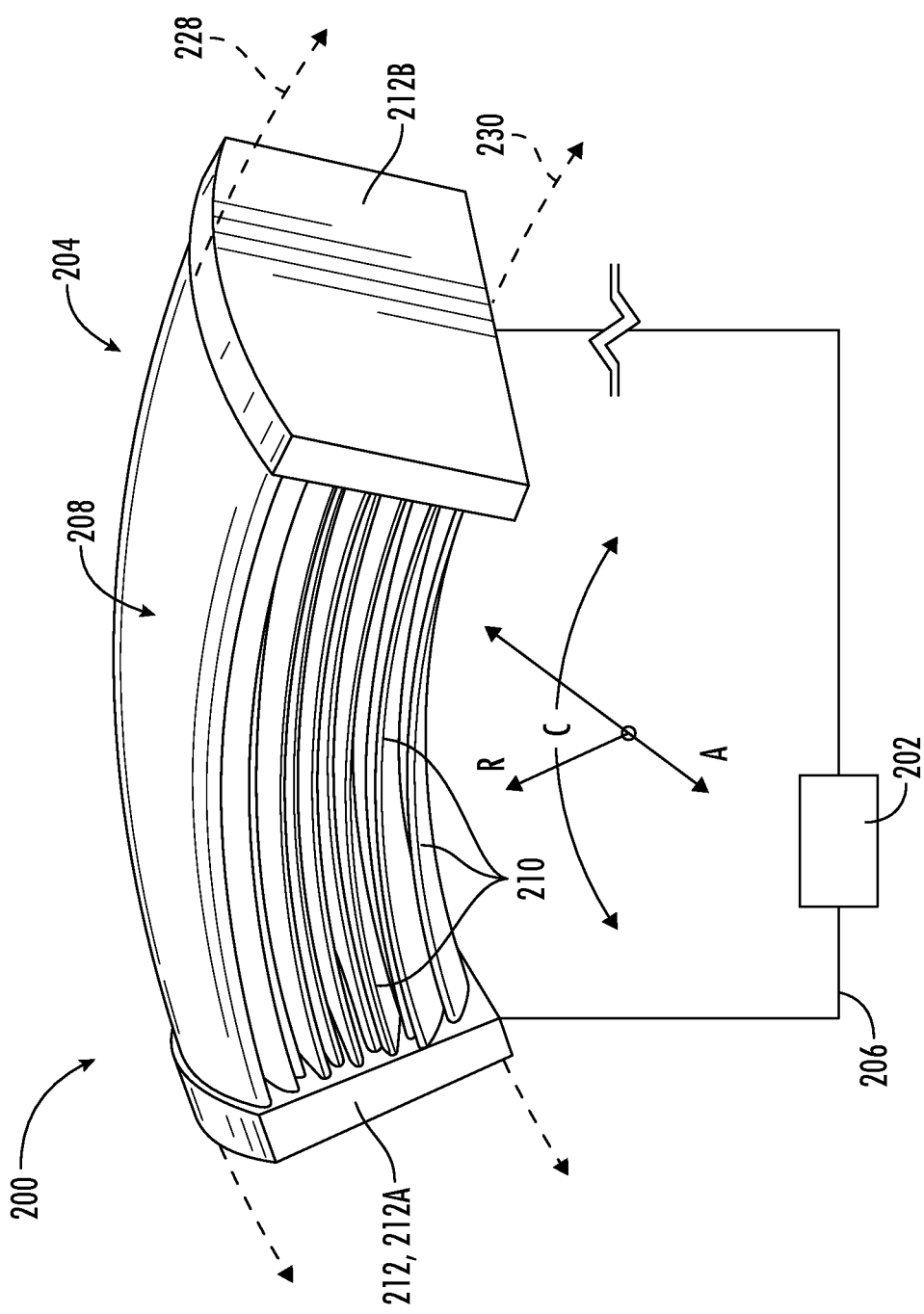
FIG. 2 is a perspective view of a thermal management system in accordance with an exemplary embodiment of the present disclosure.

Referring now to FIG. 2, a thermal management system 200 in accordance with an exemplary embodiment of the present disclosure is provided. The exemplary thermal management system 200 generally includes a thermal fluid member 202, a heat exchanger assembly 204, and for the embodiment shown, a duct system 206. Although described as part of the thermal management system 200 in the embodiment of FIG. 2, in other embodiments, the thermal fluid member 202 may be configured as part of a gas turbine engine in which the thermal management system 200 is installed.

For example, in at least certain exemplary embodiments the thermal management system 200 may be incorporated into the exemplary engine 100 described above with reference to FIG. 1. In such an exemplary aspect, the heat exchanger assembly 204 may be configured in a similar manner as the exemplary heat exchanger 198 and positioned in a working gas flowpath similar to the fan duct 172 of the engine 100. Further, with such exemplary aspect, the thermal fluid member 202 may be one or more of a lubrication oil system, a cooled cooling air system, an electronics cooling system, etc. The thermal fluid member 202 may circulate a thermal fluid from such system (e.g., lubrication oil from the lubrication oil system) through the duct system 206 to thermally connect the thermal fluid member 202 to the heat exchanger assembly 204. Alternatively, the thermal fluid member 202 may be an intermediate heat exchanger configured to thermally connect to such a system, and may circulate an intermediate thermal fluid through the duct system 206.

The heat exchanger assembly 204 depicted in FIG. 2 generally includes a core section 208 having a plurality of heat exchange members 210 and a heat exchange manifold 212 in fluid communication with the thermal fluid member 202. In particular, for the embodiment shown, the heat exchange manifold 212 is an inlet heat exchange manifold 212A configured to receive a flow of thermal fluid from the thermal fluid member 202, and the heat exchanger assembly 204 further includes an outlet heat exchange manifold 212B positioned opposite the core section 208 of the inlet heat exchange manifold 212A and configured to provide the flow of thermal fluid back to the thermal fluid member 202.

Notably, in the embodiment shown, the inlet heat exchange manifold 212A extends in a first reference plane defined by an axial direction A and a radial direction R of the thermal management system 200 (which may align with the axial direction A and radial direction R of the exemplary engine 100 of FIG. 1 when the thermal management system 200 is installed in such a gas turbine engine). The plurality of heat exchange members 210 extend normal to the first reference plane. More specifically, it will be appreciated that the thermal management system 200 further defines a circumferential direction C (which, again, may align with the circumferential direction C of the exemplary engine 100 of FIG. 1, when the thermal management system 200 is installed in such a gas turbine engine), and the plurality of heat exchange members 210 extend in the circumferential direction C from the inlet heat exchange manifold 212A to the outlet heat exchange manifold 212B. As will further be appreciated, with such a configuration, when the thermal management system 200 is installed in a gas turbine engine, the plurality of heat exchange members 210 may more specifically extend in the circumferential direction C through an annular flowpath of the gas turbine engine (e.g., in the circumferential direction C through the fan duct 172 in the embodiment of FIG. 1).

As will be explained in more detail below, the thermal fluid may generally flow into the inlet heat exchange manifold 212A, where the thermal fluid is routed into and through the plurality of heat exchange members 210 of the core section 208. The heat exchange members 210 may be positioned within an airflow duct of a gas turbine engine, such as within an annular flowpath of the gas turbine engine, such that relatively cool air passes over and around the plurality of heat exchange members 210, reducing a temperature of the thermal fluid routed through the heat exchange members 210. The thermal fluid is then received by the outlet heat exchange manifold 212B.

In certain exemplary embodiments, the thermal management system 200 may include a plurality of heat exchanger assemblies 204 arranged in the working gas flowpath of the gas turbine engine. The plurality of heat exchanger assemblies 204 may be arranged in series (wherein the outlet heat exchange manifold 212B depicted in FIG. 2 is fluidly connected to an inlet heat exchange manifold of a second heat exchanger assembly; not shown), may be arranged in parallel, or may be fluidly coupled to a variety of thermal fluid members 202 of the gas turbine engine.

Figure 3:
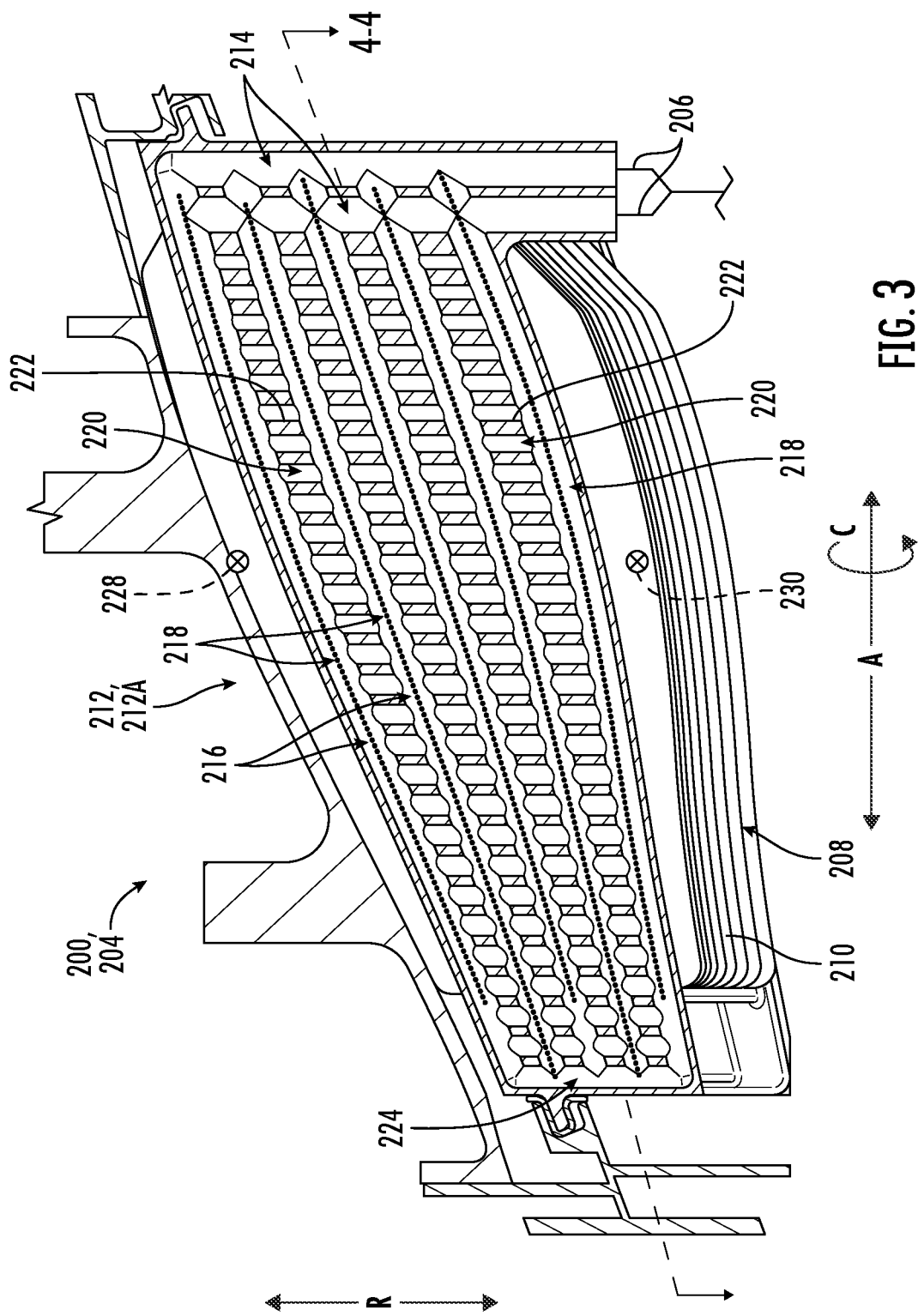
FIG. 3 is a cross-sectional view of an inlet heat exchange manifold of a heat exchanger assembly of the thermal management system of FIG. 2.

Referring now to FIG. 3, a cross-sectional view of the inlet heat exchange manifold 212A of the heat exchanger assembly 204 of FIG. 2 is depicted. As will be appreciated, the inlet heat exchange manifold 212A includes a first direction pressure vessel in fluid communication with the thermal fluid member 202 and a second direction pressure vessel extending from the first direction pressure vessel. The first direction pressure vessel and the second direction pressure vessel each extend within the first reference plane defined by the thermal management system 200, which is the view depicted in FIG. 3. Further, it will be appreciated that the second direction pressure vessel is in fluid communication with the first direction pressure vessel and with at least one of the plurality of heat exchange members 210 of the core section 208 of the heat exchanger assembly 204.

In particular, for the embodiment shown, the first direction pressure vessel is a plenum extension 214, and a second direction pressure vessel is an offtake extension 216.

Further, for the embodiment shown, the plenum extension 214 is one of a plurality of plenum extensions 214 of the inlet heat exchange manifold 212A. Each of the plurality of plenum extensions 214 is in parallel fluid communication with the thermal fluid member 202. In particular, for the embodiment shown, the inlet heat exchange manifold 212A includes two plenum extensions 214, and each of the plenum extensions 214 extends generally along the radial direction R (i.e., within 30 degrees of the radial direction R, such as within 15 degrees of the radial direction R).

Similarly, for the embodiment shown, the offtake extension 216 is one of a plurality of offtake extensions 216 of the inlet heat exchange manifold 212A. Each of the plurality of offtake extensions 216 extends from one of the plurality of plenum extensions 214 in the first reference plane. In particular, each of the plurality of offtake extensions 216 is in fluid communication with at least one of the plenum extensions 214 and is further in fluid communication with at least one of the heat exchange members 210 of the core section 208 of the heat exchanger assembly 204. More specifically, it will be appreciated that in the embodiment shown, each offtake extension 216 defines a plurality of apertures 218 arranged lengthwise along the respective offtake extension 216. Each of the plurality of apertures 218 is fluidly coupled to a heat exchange member 210 of the core section 208 of the heat exchanger assembly 204. The apertures 218 may have any suitable geometry to facilitate the transition to the heat exchange member 210 (e.g., elongated slots, circular openings, etc.).

It will further be appreciated that for the exemplary embodiment depicted, the plurality of offtake extensions 216 are further in fluid communication with one another. For example, referring briefly also to FIG. 4, providing a cross-sectional view of the inlet heat exchange manifold 212A of the heat exchanger assembly 204 of FIG. 3, as viewed along Line 4-4 in FIG. 3, it will be appreciated that the inlet heat exchange manifold 212A defines a plurality of fluid connection passages 220 extending between adjacent offtake extensions 216. Further, the inlet heat exchange manifold 212A includes a plurality of ribs 222 extending between adjacent offtake extensions 216 of the plurality of offtake extensions 216. The plurality of ribs 222 define the plurality of fluid connection passages 220.

Referring back particularly to FIG. 3, and as mentioned above, the inlet heat exchange manifold 212A includes two plenum extensions 214. The inlet heat exchange manifold 212A further includes five offtake extensions 216. It will be appreciated, however, that in other exemplary embodiments, the inlet heat exchange manifold 212A may have other suitable configurations. For example, in other exemplary embodiments, the inlet heat exchange manifold 212A may include between two and twenty (20) offtake extensions 216, such as between three and fifteen (15) offtake extensions 216, such as between four and ten (10) offtake extensions 216. Further, for example, in at least certain exemplary embodiments, the inlet heat exchange manifold 212A may include between one and eight plenum extensions 214, such as between two and five plenum extensions 214.

It will further be appreciated that the exemplary inlet heat exchange manifold 212A further includes a connector extension 224. The connector extension 224 extends between, and fluidly connects, each of the plurality of offtake extensions 216 at an end opposite the one or more plenum extensions 214.

From the above description, it will be appreciated that the inlet heat exchange manifold 212A generally includes a distributed network of fluid extensions/pressure vessels, which may collectively provide for a desired high pressure thermal fluid flow, in a relatively evenly distributed manner, to the plurality of heat exchange members 210 of the core section 208 of the heat exchanger assembly 204. Such a configuration may more specifically provide for an inlet heat exchange manifold 212 having a distributed thermal fluid delivery network capable of providing high-pressure thermal fluid to the plurality of heat exchange members 210 of the core section 208 of the heat exchanger assembly 204 in an equally distributed manner.

In particular, use of such a distributed network may allow for providing thermal fluid at the elevated pressures, while minimizing a pressure loss across the fluid network. For example, by including multiple plenum extensions, fluidly connected to one another and to the plurality of offtake extensions, the plenum extensions may have a relatively small hydraulic diameter, which may reduce a strength of the plenum extension needed to contain a given pressure of thermal fluid. Additionally, including the plurality of offtake extensions, fluidly connected to one another, and having the plurality of apertures arranged lengthwise along the offtake extensions, a smaller number of offtake extensions may be needed to fluidly couple to the plenum extensions, reducing a blockage of the thermal fluid and pressure loss during operation.

In such manner, it will be appreciated that the inlet heat exchange manifold 212A described hereinabove may be referred to as a high-pressure thermal fluid manifold. For example, during operation of a gas turbine engine including the thermal management system 200 described hereinabove, the plenum extensions 214 of the inlet heat exchange manifold 212A may be configured to receive thermal fluid at pressures between 200 pounds per square inch (psi) and 3,000 psi, such as greater than 300 psi, such as greater than 500 psi, such as greater than 1,000 psi.

Moreover, it will be appreciated that the inlet heat exchange manifold 212A depicted and described hereinabove is configured as a monolithic component, which may reduce a likelihood of leaks and other points of failure and provide for the geometry described herein, which may be necessary to accommodate the relatively high pressure thermal fluid during operation of the thermal management system 200. For example, in certain exemplary embodiments, the inlet heat exchange manifold 212A may be formed through additive manufacturing.

It will further be appreciated that the inlet heat exchange manifold 212A described hereinabove may provide for a more compact heat exchange manifold 212, allowing for the heat exchange manifold 212 to occupy a smaller circumferential footprint when incorporated into a gas turbine engine. For example, in certain exemplary embodiments, the heat exchanger assembly 204 may be positioned within an annular flowpath 226 of gas turbine engine (see FIG. 4; see also, e.g., FIG. 1). For example, heat exchanger assembly 204 may be incorporated into a gas turbine engine having an outer circumferential reference line 228 along the radial direction R at an axial location along the axial direction A and an inner circumferential reference line 230 along the radial direction R at the axial location (FIG. 3, see, also, FIG. 2). The outer circumferential reference line 228 may correspond to a radially outer boundary for the annular flowpath 226 and the inner circumferential reference line 230 may correspond to a radially inner boundary for the annular flowpath 226. The inlet heat exchange manifold 212A may be positioned at least partially between the outer circumferential reference line 228 and the inner circumferential reference line 230 (see, e.g., FIG. 2).

Figure 4:
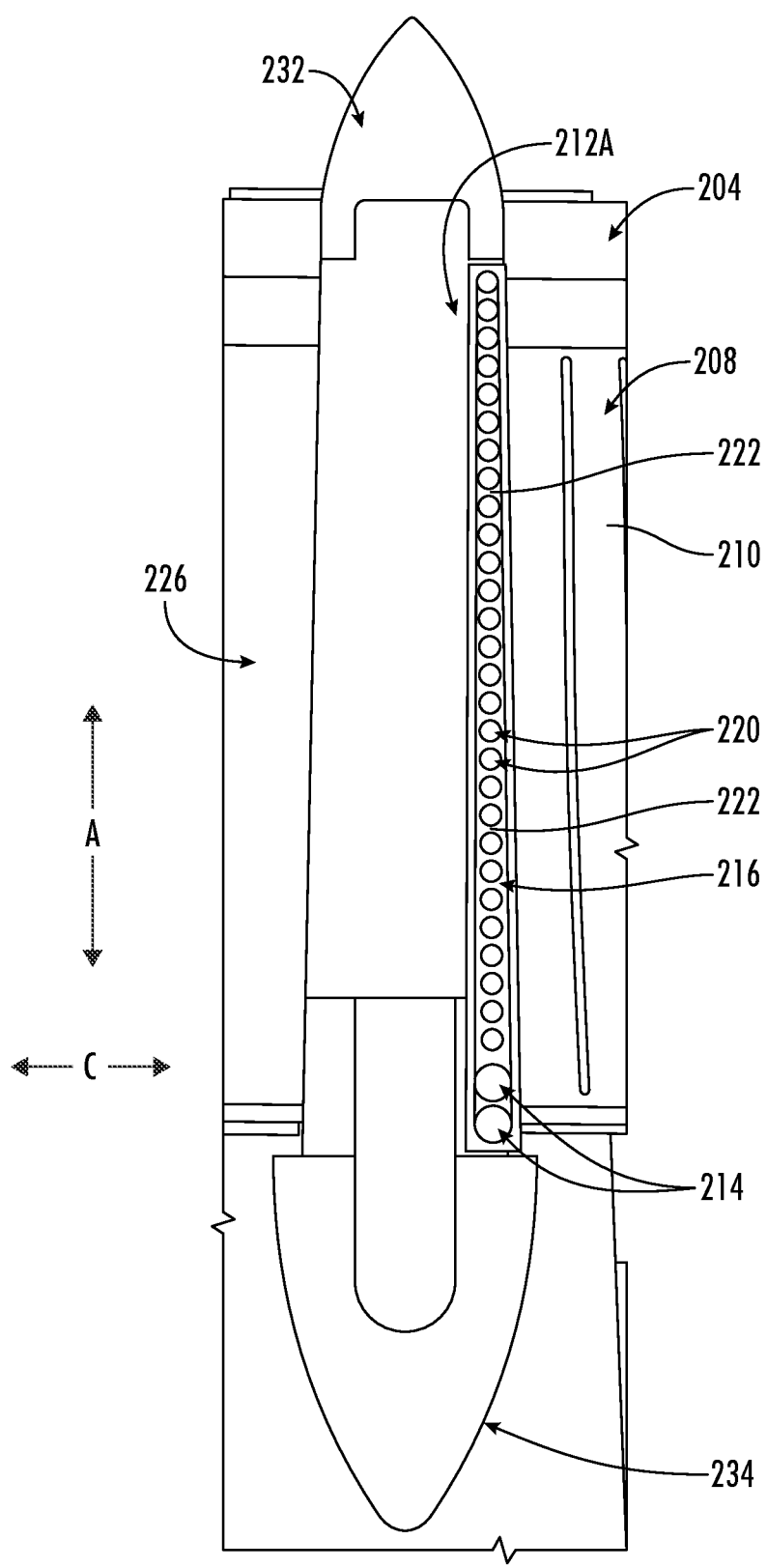
FIG. 4 is a cross-sectional view of the inlet heat exchange manifold of the heat exchanger assembly of FIG. 3, as viewed along Line 4-4 in FIG. 3.

Further, referring again to FIG. 4, the gas turbine engine within which the thermal management system 200 is positioned may include a strut 232 extending through the annular flowpath 226, e.g., at the axial location discussed above. As is depicted in FIG. 4, it will be appreciated that the strut 232 may include an aerodynamic surface 234 exposed to the annular flowpath 226, and the heat exchange manifold 212 may be positioned at least partially inward of the aerodynamic surface 234 of the strut 232. In such a manner, the heat exchanger assembly 204 may reduce an airflow blockage caused by incorporation of the heat exchanger assembly 204 within the gas turbine engine.

It will be appreciated that although the description above refers to an inlet heat exchange manifold 212A, in certain exemplary embodiments of the present disclosure, an outlet heat exchange manifold 212B may be provided configured in substantially the same manner as the inlet heat exchange manifold 212A described above.

Further, it will be appreciated that the exemplary heat exchange manifolds 212 described hereinabove are provided by way of example only. In other exemplary embodiments, a heat exchanger assembly 204 may be provided having a heat exchange manifold 212 configured in any other suitable manner. For example, although the heat exchanger assembly 204 described above is described as having a core section 208 extending through a working gas flowpath of an engine (e.g., a third stream, a turbomachine flowpath, a bypass flowpath, etc.), in other exemplary embodiments, the heat exchanger assembly 204 may not have a core section 208 extending through a working gas flowpath of an engine. For example, in certain exemplary embodiments, the heat exchanger assembly 204 may be positioned in an undercowl location or other engine-mounted location outside of a flowpath of the engine.

Figure 5:
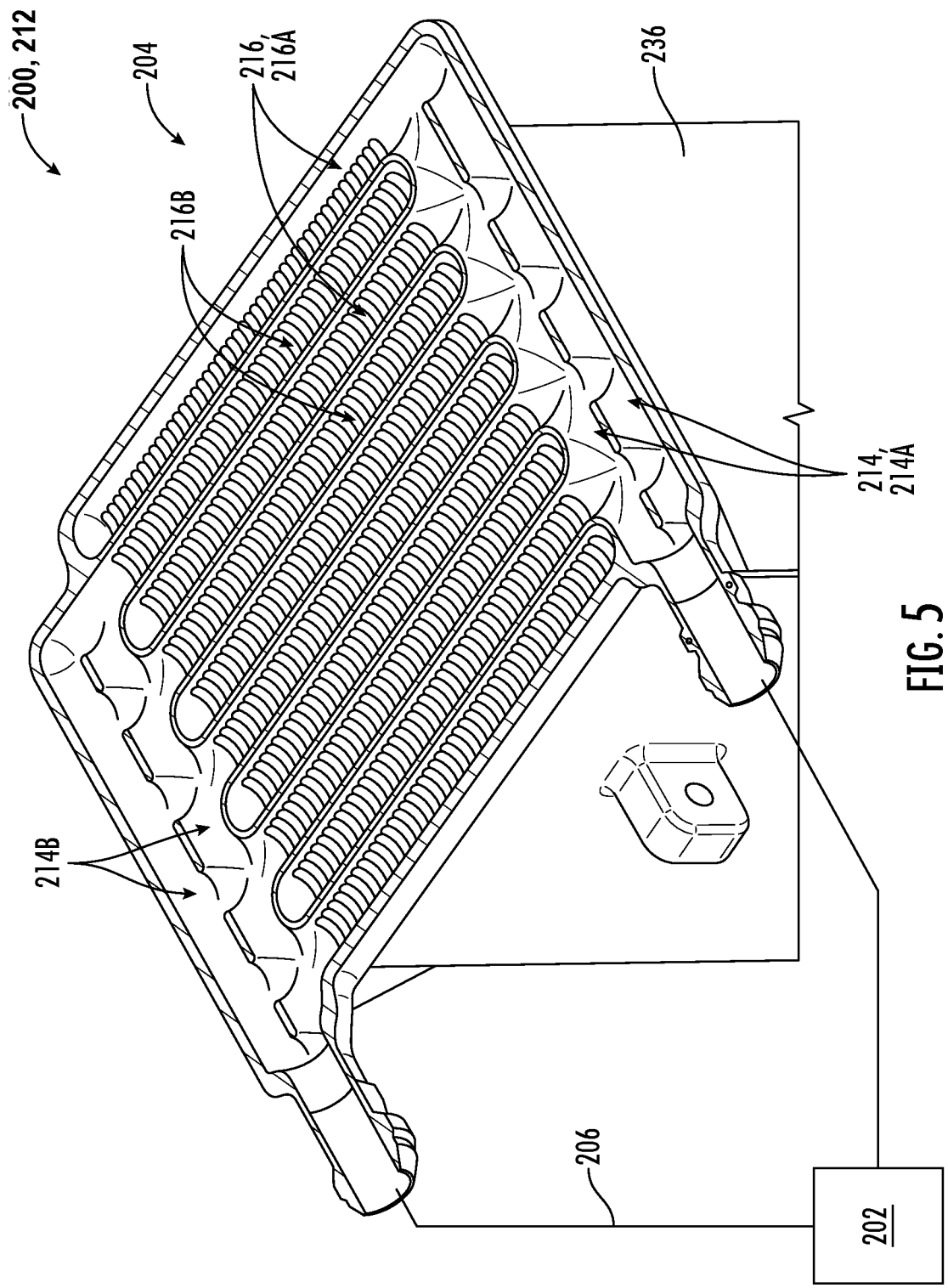
FIG. 5 is a cross-sectional view of a heat exchange manifold in accordance with another exemplary embodiment of the present disclosure.

For example, referring now to FIG. 5, a heat exchange manifold 212 in accordance with another exemplary embodiment of the present disclosure is provided. The example heat change manifold of FIG. 5 may be configured in substantially the same manner as the exemplary heat exchange manifold 212 described above.

For example, the exemplary heat exchange manifold 212 of FIG. 5 generally includes a plurality of plenum extensions 214 in fluid communication with a thermal fluid member 202, and a plurality of offtake extensions 216 extending from the plurality of plenum extensions 214. The plurality of plenum extensions 214 and the plurality of offtake extensions 216 each extend within a reference plane. Further, the plurality of offtake extensions 216 are each in fluid communication with at least one of a plurality of heat exchange members (not depicted; extending perpendicularly from the reference plane within a housing 236 of the heat exchanger assembly 204).

However, for the embodiment depicted, the exemplary heat exchange manifold 212 depicted is configured as a bidirectional heat exchange manifold 212. In particular, the plurality of plenum extensions 214 includes a plurality of inlet plenum extensions 214A and a plurality of outlet plenum extensions 214B. Similarly, the plurality of offtake extensions 216 includes a plurality of inlet offtake extensions 216A extending from the plurality of inlet plenum extensions 214A, and a plurality of outlet offtake extensions 216B extending from the plurality of outlet plenum extensions 214B. During operation, a flow of thermal fluid may be received by the plurality of inlet plenum extensions 214A and directed to the plurality of inlet offtake extensions 216A. The plurality of inlet offtake extensions 216A may provide the thermal fluid to the plurality of heat exchange members (not shown; positioned in the housing 236), which may exchange heat with a heat sink fluid flow, and return the thermal fluid to the plurality of outlet offtake extensions 216B. The plurality of outlet offtake extensions 216B may, in turn, provide the thermal fluid to the plurality of outlet plenum extensions 214B, and back to the thermal fluid member 202.

Moreover, in still other exemplary embodiments, the heat exchange manifold 212 of FIG. 5 may be an inlet heat exchange manifold, and the heat exchanger assembly 204 may further include an outlet heat exchange manifold located opposite the housing 236 from the inlet heat exchange manifold. In such a configuration, the plenum extensions and offtake extensions labeled 214A, 216A in FIG. 5 may correspond to inlet plenum extensions and inlet offtake extension for a first thermal fluid, and the plenum extensions and offtake extensions labeled 214B, 216B in FIG. 5 may correspond to inlet plenum extensions and inlet offtake extensions for a second thermal fluid. The first thermal fluid may be a hot fluid and the second thermal fluid may be a cold fluid.

Further, in still other exemplary embodiments, the heat exchanger assembly 204 may run in a counter-flow configuration, in which case the plenum extensions and offtake extensions labeled 214A, 216A in FIG. 5 may correspond to inlet plenum extensions and inlet offtake extension for a first thermal fluid, and the plenum extensions and offtake extensions labeled 214B, 216B in FIG. 5 may correspond to outlet plenum extensions and outlet offtake extensions for a second thermal fluid.

Further, still, in other exemplary embodiments, a heat exchanger assembly 204 of the present disclosure may be used in a field outside of gas turbine engines. For example, in other exemplary aspects of the present disclosure, a heat exchanger assembly 204 in accordance with one or more exemplary aspects described herein may be used with internal combustion engines, or other machines or systems in need of heat transfer to/from a high pressure thermal fluid.

Figure 6:
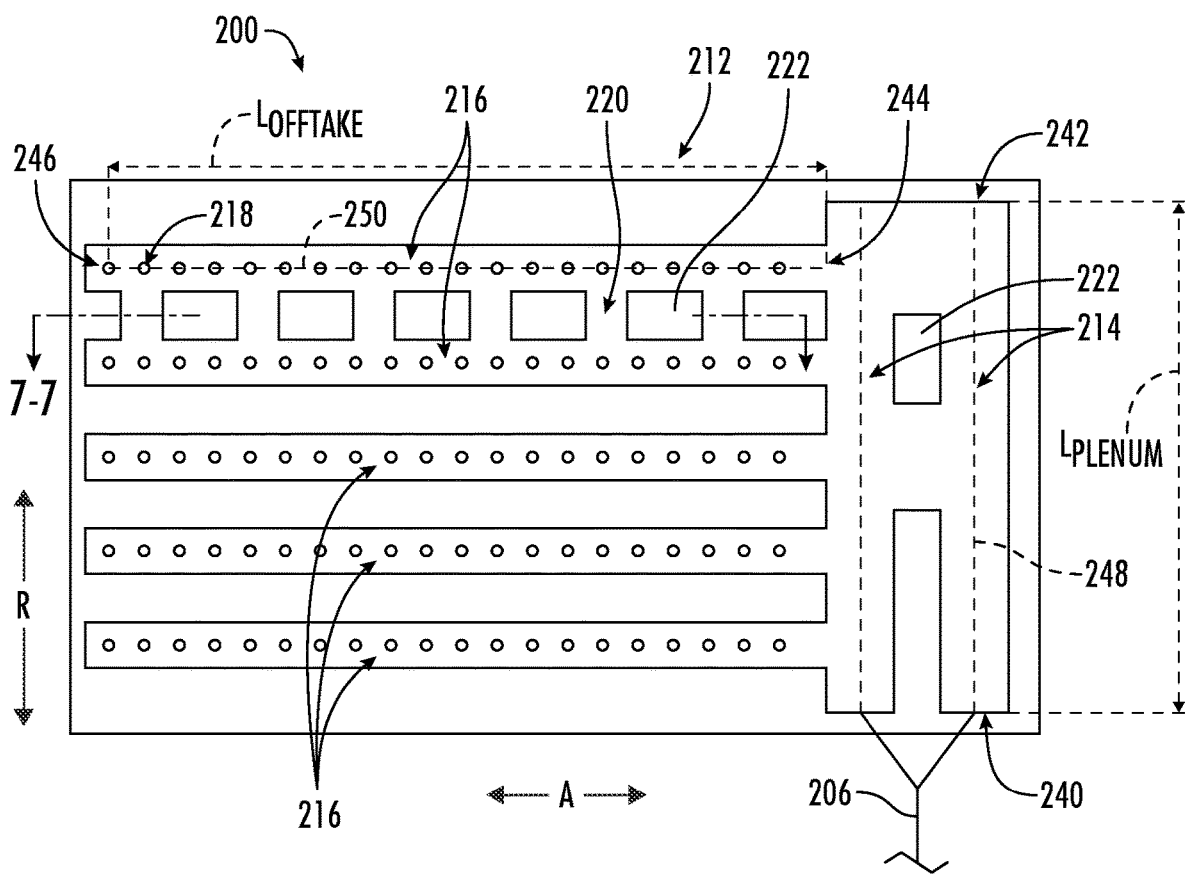
FIG. 6 is a schematic view of a heat exchange manifold of a heat exchanger assembly in accordance with another exemplary embodiment of the present disclosure.

Referring now to FIG. 6, a schematic view of the heat exchange manifold 212 of a heat exchanger assembly 204 in accordance with another exemplary embodiment of the present disclosure is provided. The exemplary heat exchange manifold 212 of FIG. 6 may be configured in a similar manner as one or more of the exemplary heat exchange manifolds 212 described herein.

For example, the heat exchange manifold 212 of FIG. 6 includes a plurality of plenum extensions 214 and a plurality of offtake extensions 216. Additionally, at least two of the plurality of offtake extensions 216 are fluidly connected to one another and include a plurality of ribs 222 extending therebetween. Further, for the embodiment depicted, the plurality of plenum extensions 214 are fluidly connected to one another through a plurality of fluid connection passages 220 and include at least one rib 222 extending therebetween.

As will be appreciated from this schematic view of FIG. 6, each of the plurality of plenum extensions 214 extends between a plenum extension inlet 240 and a plenum extension outlet 242, and defines a plenum extension length $L_{Plenum}$ from the plenum extension inlet 240 to the plenum extension outlet 242. Similarly, each of the plurality of offtake extensions 216 extends from an offtake extension inlet 244 to an offtake extension outlet 246, and defines an offtake extension length $L_{Offtake}$ from the offtake extension inlet 244 to the offtake extension outlet 246.

As used herein, the plenum extension inlet 240 is positioned where the plenum extension 214 connects with a duct system 206 of the thermal management system 200, at an upstream-most location along the plenum extension 214 (i.e., in the case of an inlet heat exchange manifold 212A; the opposite would be true in the case of outlet heat exchange manifold 212B). In the case where a plurality of plenum extensions 214 are provided, the plenum extension inlet 240 for each plenum extension 214 is located where the plenum extension connects with the duct system 206, or where the plenum extensions 214 split from one another (see, e.g., FIG. 5). As used herein, the plenum extension outlet 242 is located where the plenum extension 214 terminates.

The plenum extension length $L_{Plenum}$ of each plenum extension 214 is a length along a centerline 248 of the respective plenum extension 214 from the respective plenum extension inlet 240 to the respective plenum extension outlet 242.

As used herein, the offtake extension inlet 244 is located where the offtake extension 216 meets the plenum extension 214, and the offtake extension outlet 246 is located where the offtake extension 216 contacts a connector extension at an end opposite the one or more plenum extensions 214 (see connector extension 224 in FIG. 3), or in the case where no connector extension is provided, at a location where the offtake extension 216 is last fluidly coupled to an adjacent offtake extension 216 or the one or more heat exchange members 210 through an aperture 218.

The offtake extension length $L_{Offtake}$ of each offtake extension 216 is a length along a centerline 250 of the respective offtake extension 216 from the respective offtake extension inlet 244 to the respective offtake extension outlet 246.

Figure 7:
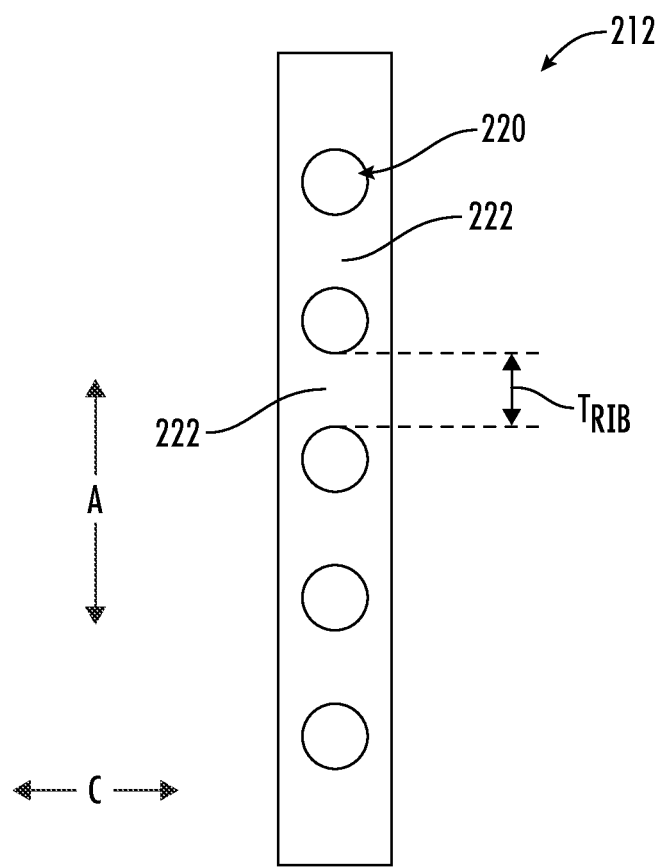
FIG. 7 is a schematic, cross-sectional view of the exemplary heat exchange manifold of FIG. 6, at a location between two adjacent offtake extensions, as viewed along Line 7-7 FIG. 6.

Referring now to FIG. 7, providing a schematic, cross-sectional view between two adjacent offtake extensions 216 in FIG. 6, as viewed along Line 7-7 FIG. 6, it will be appreciated that each of the ribs 222 is positioned between adjacent fluid connection passages 220 (fluidly connecting the adjacent offtake extensions 216) and defines a rib thickness $T_{Rib}$. The rib thickness $T_{Rib}$ refers to a minimum distance between adjacent connection passages 220.

Further, it will be appreciated that the inlet heat exchange manifold 212A defines an average rib thickness $T_{Rib\_Avg}$ equal to a sum of all the rib thicknesses $T_{Rib}$ divided by the total number of ribs 222 in the inlet heat exchange manifold 212A.

It will further be appreciated that each of the plenum extension inlets 240 defines a plenum extension inlet hydraulic diameter $Dh_{Plenum\_Inlet}$, each of the plenum extension outlets 242 defines a plenum extension outlet hydraulic diameter $Dh_{Plenum\_Exit}$, each of the offtake extension inlets 244 defines an offtake extension inlet hydraulic diameter $Dh_{Offtake\_Inlet}$, and each of the offtake extension outlets 246 defines an offtake extension outlet hydraulic diameter $Dh_{Offtake\_Exit}$.

Moreover, it will be appreciated that the heat exchange manifold 212 defines (a) an average plenum extension inlet hydraulic diameter $Dh_{Plenum\_Inlet\_Avg}$ equal to a sum of all the plenum extension inlet hydraulic diameters $Dh_{Plenum\_Inlet}$ divided by the total number of inlet plenum extension inlets 240; (b) an average plenum extension outlet hydraulic diameter $Dh_{Plenum\_Exit\_Avg}$ equal to a sum of all the plenum extension outlet hydraulic diameters $Dh_{Plenum\_Exit}$ divided by the total number of inlet plenum extension outlets 242; (c) an average offtake extension inlet hydraulic diameter $Dh_{Offtake\_Inlet\_Avg}$ equal to a sum of all the offtake extension inlet hydraulic diameters $Dh_{Offtake\_Inlet}$ divided by the total number of offtake extension inlets 244; (d) an average offtake extension outlet hydraulic diameter $Dh_{Offtake\_Exit\_Avg}$ equal to a sum of all the offtake extension outlet hydraulic diameters $Dh_{Offtake\_Exit}$ divided by the total number of offtake extension outlets 246; (e) an average plenum extension length $L_{Plenum\_Avg}$ equal to a sum of all the plenum extension lengths $L_{Plenum}$ divided by the total number of plenum extensions 214; and (f) an average offtake extension length $L_{Offtake\_Avg}$ equal to a sum of all the offtake extension lengths $L_{Offtake}$ divided by the total number of offtake extensions 216.

As alluded to earlier, the inventors discovered, unexpectedly during the course of heat exchanger and gas turbine engine design—i.e., designing gas turbine engines having a heat exchanger with a variety of plenum hydraulic diameter ratios, offtake hydraulic diameter ratios, plenum to offtake length ratios, average offtake hydraulic diameter to rib thicknesses, and average plenum hydraulic diameter to rib thicknesses, and evaluating an overall engine and heat exchanger performance-a significant relationship exists among (a) a plenum hydraulic diameter ratio, an offtake hydraulic diameter ratio, and a plenum to offtake length ratio, as well as (b) between an average offtake hydraulic diameter to rib thicknesses and average plenum hydraulic diameter to rib thicknesses. These relationships can be thought of as indicators of the ability of a gas turbine engine and heat exchanger to be able to transfer a relatively high amount of heat from a thermal fluid, operating at a high pressure, to a heat sink (e.g., a working gas footpath of the engine), without requiring a relatively heavy design creating an undesirable blockage in a working gas flowpath of the engine.

The relationships apply to a heat exchanger assembly having a core section with a plurality of heat exchange members and a heat exchange manifold required to provide a high pressure thermal fluid in an equally distributed manner to the plurality of heat exchanger members. The relationship ties the geometric relationship of the various extensions and/or connectors to the ability to withstand a desired high pressure, without an impermissible pressure drop, and with a desired distribution capacity.

In particular, the inventors discovered that by balancing the inlet and outlet hydraulic diameters of the plenum extension(s), the inlet and outlet hydraulic diameters of the offtake extensions, and a length ratio of the plenum extension(s) to the offtake extensions, a heat exchanger having the above noted desired characteristics may be achieved. Similarly, the inventors discovered that by balancing the size of the inlet and outlet hydraulic diameters of the plenum extension(s) with an average rib thickness, and the size of the inlet and outlet hydraulic diameters of the offtake extensions with the average rib thickness, a heat exchanger having the above noted desired characteristics may be achieved.

For example, the inventors of the present disclosure found that by bounding the relationship of the above-noted parameters on an upper end, the heat exchanger may achieve the above-noted benefits without being prohibitively difficult to manufacture and including desired strength characteristics to accommodate the anticipated pressures in an efficient manner.

The relationship discovered, infra, can therefore identify an improved gas turbine engine and heat exchanger configuration suited for a particular mission requirement, one that takes into account efficiency, weight, thermal capacity needs, complexity, reliability, and other factors influencing the optimal choice for a gas turbine engine and heat exchanger configuration.

In addition to yielding an improved gas turbine engine and heat exchanger, as explained in detail above, utilizing this relationship, the inventors found that the number of suitable or feasible gas turbine engine and heat exchanger designs capable of meeting the above design requirements could be greatly diminished, thereby facilitating a more rapid down selection of designs to consider as a gas turbine engine and heat exchanger is being developed. Such a benefit provides more insight to the requirements for a given gas turbine engine and heat exchanger well before specific technologies, integration and system requirements are developed fully. Such a benefit avoids late-stage redesign.

The desired relationships providing for the improved heat exchanger discovered by the inventors, are a Hydraulic Diameter Relationship (HDR) and a Rib Thickness Relationship (RTR). The HDR is expressed as:

$$\frac{Dh_{Offtake\_Inlet\_Avg}}{Dh_{Offtake\_Exit\_Avg}} \times \frac{Dh_{Plenum\_Inlet\_Avg}}{Dh_{Plenum\_Exit\_Avg}} \times \frac{L_{Plenum\_Avg}}{L_{Offtake\_Avg}},$$

where $Dh_{Offtake\_Inlet\_Avg}$ is an average offtake extension inlet hydraulic diameter; $Dh_{Offtake\_Exit\_Avg}$ is average offtake extension outlet hydraulic diameter; $Dh_{plenum\_Inlet\_Avg}$ is an average plenum extension inlet hydraulic diameter; $Dh_{plenum\_Exit\_Avg}$ is an average ple-num extension outlet hydraulic diameter; $L_{plenum\_Avg}$ is an average plenum extension length; and $L_{Offtake\_Avg}$ is an average offtake extension length.

The RTR is expressed as:

$$\frac{Dh_{Offtake\_Inlet\_Avg} + Dh_{Offtake\_Exit\_Avg}}{2 \times T_{Rib\_Avg}} \times \frac{Dh_{Plenum\_Inlet\_Avg} + Dh_{Plenum\_Exit\_Avg}}{2 \times T_{Rib\_Avg}}.$$

where $T_{Rib\_Avg}$ is an average rib thickness.

A heat exchanger assembly of the present disclosure, configured to achieve the above-described benefits identified by the HDR and RTR may have one or more of the following values:

TABLE 1

| Symbol | Description | Ranges |
|---|---|---|
| HDR | Hydraulic Diameter Relationship | 0.00275 to 378, such as 0.055 to 13 |
| RTR | Rib Thickness Ratio | 0.315 to 375, such as 0.984 to 30.8 |
| $\dfrac{Dh_{Offtake\_Inlet\_Avg}}{Dh_{Offtake\_Exit\_Avg}}$ | Offtake hydraulic diameter ratio | 0.058 to 11.02, such as 0.284 to 2.42 |
| $\dfrac{Dh_{Plenum\_Inlet\_Avg}}{Dh_{Plenum\_Exit\_Avg}}$ | Plenum hydraulic diameter ratio | 0.114 to 18.385, such as 0.392 to 3.32 |
| $\dfrac{L_{Plenum\_Avg}}{L_{Offtake\_Avg}}$ | Plenum to Offtake length ratio | 0.417 to 1.862, such as 0.497 to 1.601 |
| $\dfrac{Dh_{Offtake\_Inlet\_Avg} + Dh_{Offtake\_Exit\_Avg}}{2 \times T_{Rib\_Avg}}$ | Average Offtake hydraulic diameter to rib thickness | 0.685 to 18.9, such as 1.09 to 5.13 |
| $\dfrac{Dh_{Plenum\_Inlet\_Avg} + Dh_{Plenum\_Exit\_Avg}}{2 \times T_{Rib\_Avg}}$ | Average Plenum hydraulic diameter to rib thickness | 0.461 to 19.8, such as 0.902 to 6.01 |

Figures 8, 9:
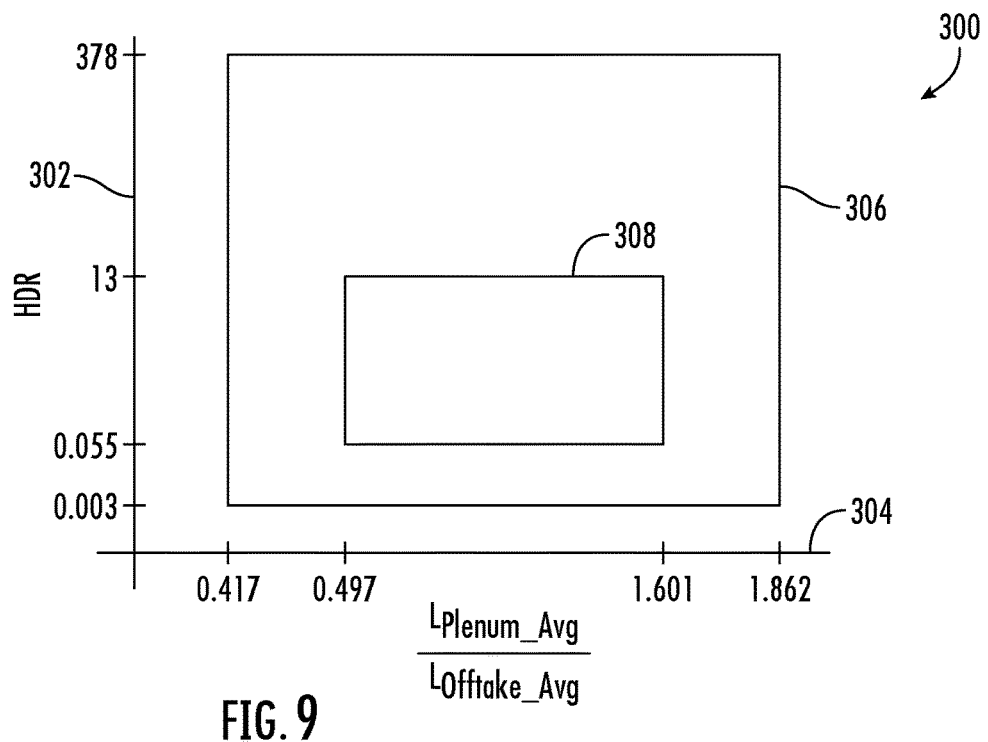
FIG. 8 is a table including numerical values corresponding to several heat exchangers falling within ranges depicted in FIG. 9.
FIG. 9 provides a plot of Hydraulic Diameter Relationship (HDR) values on a Y-axis and plenum to offtake length ratios on an X-axis.
Figures 10, 11:
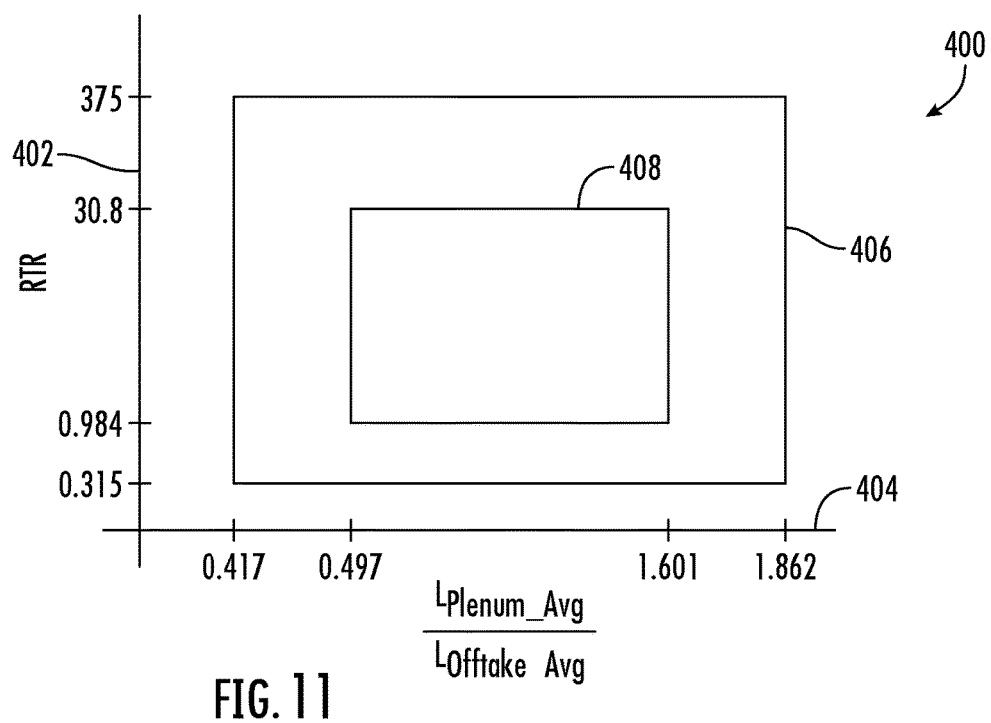
FIG. 10 provides a table including numerical values corresponding to several heat exchangers falling within ranges depicted in FIG. 11.
FIG. 11 provides a plot of Rib Thickness Relationship (RTR) values on a Y-axis and plenum to offtake length ratios on an X-axis.

Referring now to FIGS. 8 through 11, various heat exchangers in accordance with the present disclosure are provided. FIG. 8 provides a table including numerical values corresponding to several heat exchangers falling within the ranges depicted in FIG. 9; and FIG. 9 provides a plot 300 of HDR values on a Y-axis 302 and plenum to offtake length ratios on an X-axis 304. Similarly, FIG. 10 provides a table including numerical values corresponding to several heat exchangers falling within the ranges depicted in FIG. 11; and FIG. 11 provides a plot 400 of RTR values on a Y-axis 402 and plenum to offtake length ratios on an X-axis 404.

Referring particularly to FIG. 9, the plot 300 depicts a first range 306, with HDR values greater than or equal to 0.00275 and less than or equal to 378, with a plenum to offtake length ratio greater than or equal to 0.417 and less than or equal to 1.862. FIG. 9 further depicts a second range 308, with HDR values greater than or equal to 0.055 and less than or equal to 13, with a plenum to offtake length ratio greater than or equal to 0.497 and less than or equal to 1.601. Similarly, in FIG. 11 the plot 400 depicts a first range 406, with RTR values greater than or equal to 0.315 and less than or equal to 375, with a plenum to offtake length ratio greater than or equal to 0.417 and less than or equal to 1.862. FIG. 11 further depicts a second range 408, with RTR values greater than or equal to 0.984 and less than or equal to 30.8, with a plenum to offtake length ratio greater than or equal to 0.497 and less than or equal to 1.601.

Further aspects are provided by the subject matter of the following clauses:

A gas turbine engine defining a reference plane, the gas turbine engine comprising: a thermal management system having a thermal fluid member having a flow of thermal fluid therethrough during operation of the gas turbine engine and a heat exchanger assembly, the heat exchanger assembly comprising: a core section comprising a plurality of heat exchange members; and a heat exchange manifold comprising a first direction pressure vessel in fluid communication with the thermal fluid member and a second direction pressure vessel extending from the first direction pressure vessel, the first and second direction pressure vessels each extending in the reference plane, the second direction pressure vessel in fluid communication with the first direction pressure vessel and with at least one of the plurality of heat exchange members.

The gas turbine engine of any preceding clause, wherein the second direction pressure vessel is one of a plurality of second direction pressure vessels of the heat exchange manifold, wherein each of the plurality of second direction pressure vessels extends from the first direction pressure vessel in the reference plane, is in fluid communication with the first direction pressure vessel, and is in fluid communication with at least one of the plurality of heat exchange members.

The gas turbine engine of any preceding clause, wherein the plurality of second direction pressure vessels are further in fluid communication with one another.

The gas turbine engine of any preceding clause, wherein the heat exchange manifold comprises a plurality of ribs extending between adjacent second direction pressure vessels of the plurality of second direction pressure vessels.

The gas turbine engine of any preceding clause, wherein the plurality of heat exchange members extend normal to the reference plane.

The gas turbine engine of any preceding clause, wherein the first direction pressure vessel is one of a plurality of first direction pressure vessels of the heat exchange manifold, wherein each of the plurality of first direction pressure vessels is in parallel fluid communication with the thermal fluid member.

The gas turbine engine of any preceding clause, wherein the thermal fluid member is a thermal fluid source, and wherein the heat exchange manifold is an inlet heat exchange manifold configured to receive the flow of thermal fluid, and wherein the heat exchanger assembly further comprises an outlet heat exchange manifold positioned opposite the core section from the inlet heat exchange manifold.

The gas turbine engine of any preceding clause, wherein the heat exchange manifold is a monolithic component.

The gas turbine engine of any preceding clause, wherein the heat exchange manifold is formed through additive manufacturing.

The gas turbine engine of any preceding clause, wherein the heat exchange manifold is a high pressure thermal fluid manifold.

The gas turbine engine of any preceding clause, wherein the gas turbine engine defines an axial direction and a radial direction, wherein the gas turbine engine comprises an annular flowpath having an outer circumferential reference line along the radial direction at an axial location along the axial direction and an inner circumferential reference line along the radial direction at the axial location, and wherein the heat exchange manifold is positioned at least partially between the outer circumferential reference line and the inner circumferential reference line.

The gas turbine engine of any preceding clause, wherein the gas turbine engine defines a circumferential direction, and wherein the plurality of heat exchange members extend through the annular flowpath in the circumferential direction.

The gas turbine engine of any preceding clause, wherein the annular flowpath is a third stream of the gas turbine engine.

The gas turbine engine of any preceding clause, wherein the gas turbine engine further comprises a strut extending through the annular flowpath and having an aerodynamic surface exposed to the annular flowpath, wherein the heat exchange manifold is positioned inward of the aerodynamic surface of the strut.

The gas turbine engine of any preceding clause, wherein the first direction pressure vessel is a plenum extension, and wherein the second direction pressure vessel is an offtake extension.

The gas turbine engine of any preceding clause, wherein the gas turbine engine defines a radial direction and an axial direction, and wherein the reference plane extends in the radial direction and in the axial direction.

A thermal management system defining a reference plane, the thermal management system comprising: a thermal fluid member having a flow of thermal fluid therethrough during operation; and a heat exchanger assembly, the heat exchanger assembly comprising: a core section comprising a plurality of heat exchange members; and a heat exchange manifold comprising a first direction pressure vessel in fluid communication with the thermal fluid member and a second direction pressure vessel extending from the first direction pressure vessel, the first and second direction pressure vessels each extending in the reference plane, the second direction pressure vessel in fluid communication with the first direction pressure vessel and with at least one of the plurality of heat exchange members.

The thermal management system of any preceding clause, wherein the second direction pressure vessel is one of a plurality of second direction pressure vessels of the heat exchange manifold, wherein each of the plurality of second direction pressure vessels extends from the first direction pressure vessel in the reference plane, is in fluid communication with the first direction pressure vessel, and is in fluid communication with at least one of the plurality of heat exchange members.

The thermal management system of any preceding clause, wherein the plurality of second direction pressure vessels are further in fluid communication with one another.

The thermal management system of any preceding clause, wherein the heat exchange manifold comprises a plurality of ribs extending between adjacent second direction pressure vessels of the plurality of second direction pressure vessels.

A heat exchanger assembly of a thermal management system having a thermal fluid member, the heat exchanger assembly comprising: a core section comprising a plurality of heat exchange members; and a heat exchange manifold comprising: one or more plenum extensions configured to be in fluid communication with the thermal fluid member, the one or more plenum extensions defining an average plenum inlet hydraulic diameter ($Dh_{Plenum\_Inlet\_Avg}$), an average plenum exit hydraulic diameter ($Dh_{Plenum\_Exit\_Avg}$), and an average plenum length ($L_{Plenum\_Avg}$); a plurality of offtake extensions extending from the one or more plenum extensions and in fluid communication with the plurality of heat exchange members, the plurality of offtake extensions defining an average offtake inlet hydraulic diameter ($Dh_{Offtake\_Inlet\_Avg}$), an average offtake exit hydraulic diameter ($Dh_{Offtake\_Exit\_Avg}$) and an average offtake length ($L_{Offtake\_Avg}$); wherein the heat exchange manifold defines a hydraulic diameter relationship (HDR) greater than 0.00275 and less than 378, wherein HDR is equal to:

$$\frac{Dh_{Offtake\_Inlet\_Avg}}{Dh_{Offtake\_Exit\_Avg}} \times \frac{Dh_{Plenum\_Inlet\_Avg}}{Dh_{Plenum\_Exit\_Avg}} \times \frac{L_{Plenum\_Avg}}{L_{Offtake\_Avg}}.$$

The heat exchanger assembly of any preceding clause, wherein the heat exchange manifold further comprises one or more ribs extending between adjacent offtake extensions of the plurality of offtake extensions, or between adjacent plenum extensions of the one or more plenum extensions, or both.

The heat exchanger assembly of any preceding clause, wherein the one or more ribs define an average rib thickness ($T_{Rib\_Avg}$) wherein the heat exchange manifold defines a rib thickness relationship (RTR) greater than 0.315 and less than 375, wherein RTR is equal to:

$$\frac{Dh_{Offtake\_Inlet\_Avg} + Dh_{Offtake\_Exit\_Avg}}{2 \times T_{Rib\_Avg}} \times \frac{Dh_{Plenum\_Inlet\_Avg} + Dh_{Plenum\_Exit\_Avg}}{2 \times T_{Rib\_Avg}}.$$

The heat exchanger assembly of any preceding clause, wherein $$\frac{Dh_{Offtake\_Inlet\_Avg} + Dh_{Offtake\_Exit\_Avg}}{2 \times T_{Rib\_Avg}}$$

is between 0.27 and 23, and wherein $$\frac{Dh_{Plenum\_Inlet\_Avg} + Dh_{Plenum\_Exit\_Avg}}{2 \times T_{Rib\_Avg}}$$

is between 0.27 and 22.

The heat exchanger assembly of any preceding clause, wherein $$\frac{Dh_{Offtake\_Inlet\_Avg} + Dh_{Offtake\_Exit\_Avg}}{2 \times T_{Rib\_Avg}}$$

is between 0.78 and 6.02, and wherein $$\frac{Dh_{Plenum\_Inlet\_Avg} + Dh_{Plenum\_Exit\_Avg}}{2 \times T_{Rib\_Avg}}$$

is between 0.86 and 6.

The heat exchanger assembly of any preceding clause, wherein $$\frac{Dh_{Offtake\_Inlet\_Avg}}{Dh_{Offtake\_Exit\_Avg}}$$

is between 0.045 and 23.

The heat exchanger assembly of any preceding clause, wherein $$\frac{Dh_{Offtake\_Inlet\_Avg}}{Dh_{Offtake\_Exit\_Avg}}$$

is between 0.25 and 4.

The heat exchanger assembly of any preceding clause, wherein $$\frac{Dh_{Plenum\_Inlet\_Avg}}{Dh_{Plenum\_Exit\_Avg}}$$

is between 0.045 and 23.

The heat exchanger assembly of any preceding clause, wherein $$\frac{Dh_{Plenum\_Inlet\_Avg}}{Dh_{Plenum\_Exit\_Avg}}$$

is between 0.25 and 4.

The heat exchanger assembly of any preceding clause, wherein $$\frac{L_{Plenum\_Avg}}{L_{Offtake\_Avg}}$$

is between 0.02 and 5.

The heat exchanger assembly of any preceding clause, wherein $$\frac{L_{Plenum\_Avg}}{L_{Offtake\_Avg}}$$

is between 0.4 and 1.72.

The heat exchanger assembly of any preceding clause, wherein each of the plurality of offtake extensions extends from the one or more plenum extensions in a reference plane of the thermal management system.

A heat exchanger assembly of a thermal management system having a thermal fluid member, the heat exchanger assembly comprising: a core section comprising a plurality of heat exchange members; and a heat exchange manifold comprising: one or more plenum extensions configured to be in fluid communication with the thermal fluid member, the one or more plenum extensions defining an average plenum inlet hydraulic diameter ($Dh_{Plenum\_Inlet\_Avg}$) and an average plenum exit hydraulic diameter ($Dh_{Plenum\_Exit\_Avg}$); a plurality of offtake extensions extending from the one or more plenum extensions and in fluid communication with the plurality of heat exchange members, the plurality of offtake extensions defining an average offtake inlet hydraulic diameter ($Dh_{Offtake\_Inlet\_Avg}$) and an average offtake exit hydraulic diameter ($Dh_{Offtake\_Exit\_Avg}$); one or more ribs extending between adjacent offtake extensions of the plurality of offtake extensions, or between adjacent plenum extensions of the one or more plenum extensions, or both; wherein the one or more ribs define an average rib thickness ($T_{Rib\_Avg}$)

wherein the heat exchange manifold defines a rib thickness relationship (RTR) greater than 0.315 and less than 375, wherein RTR is equal to:

$$\frac{Dh_{Offtake\_Inlet\_Avg} + Dh_{Offtake\_Exit\_Avg}}{2 \times T_{Rib\_Avg}} \times \frac{Dh_{Plenum\_Inlet\_Avg} + Dh_{Plenum\_Exit\_Avg}}{2 \times T_{Rib\_Avg}}.$$

The heat exchanger assembly of any preceding clause, wherein $$\frac{Dh_{Offtake\_Inlet\_Avg} + Dh_{Offtake\_Exit\_Avg}}{2 \times T_{Rib\_Avg}}$$

is between 0.27 and 23, and wherein $$\frac{Dh_{Plenum\_Inlet\_Avg} + Dh_{Plenum\_Exit\_Avg}}{2 \times T_{Rib\_Avg}}$$

is between 0.27 and 22.

The heat exchanger assembly of any preceding clause, wherein $$\frac{Dh_{Offtake\_Inlet\_Avg} + Dh_{Offtake\_Exit\_Avg}}{2 \times T_{Rib\_Avg}}$$

is between 0.78 and 6.02, and wherein $$\frac{Dh_{Plenum\_Inlet\_Avg} + Dh_{Plenum\_Exit\_Avg}}{2 \times T_{Rib\_Avg}}$$

is between 0.86 and 6.

The heat exchanger assembly of any preceding clause, wherein the plurality of offtake extensions further defines an average offtake length ($L_{Offtake\_Avg}$), wherein the one or more plenum extensions further defines an average plenum length ($L_{Plenum\_Avg}$).

The heat exchanger assembly of any preceding clause, wherein the heat exchange manifold defines a hydraulic diameter relationship (HDR) greater than 0.00275 and less than 378, wherein HDR is equal to:

$$\frac{Dh_{Offtake\_Inlet\_Avg}}{Dh_{Offtake\_Exit\_Avg}} \times \frac{Dh_{Plenum\_Inlet\_Avg}}{Dh_{Plenum\_Exit\_Avg}} \times \frac{L_{Plenum\_Avg}}{L_{Offtake\_Avg}}.$$

The heat exchanger assembly of any preceding clause, wherein $$\frac{Dh_{Offtake\_Inlet\_Avg}}{Dh_{Offtake\_Exit\_Avg}}$$

is between 0.045 and 23.

The heat exchanger assembly of any preceding clause, wherein $$\frac{Dh_{Plenum\_Inlet\_Avg}}{Dh_{Plenum\_Exit\_Avg}}$$

is between 0.045 and 23.

The heat exchanger assembly of any preceding clause, wherein $$\frac{L_{Plenum\_Avg}}{L_{Offtake\_Avg}}$$

is between 0.02 and 5.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining a reference plane, the gas turbine engine comprising:
   a thermal management system having a thermal fluid member having a flow of thermal fluid therethrough during operation of the gas turbine engine and a heat exchanger assembly, the heat exchanger assembly comprising:
   a core section comprising a plurality of heat exchange members; and
   a heat exchange manifold comprising a first direction pressure vessel in fluid communication with the thermal fluid member and a second direction pressure vessel extending from the first direction pressure vessel, the first direction pressure vessel and the second direction pressure vessel each extending in the reference plane, the second direction pressure vessel in fluid communication with the first direction pressure vessel and with at least one of the plurality of heat exchange members, wherein the first direction pressure vessel includes a plurality of first direction pressure vessels wherein the heat exchange manifold defines a single housing including an inlet in direct fluid communication with the thermal fluid member and an outlet in direct fluid communication with the second direction pressure vessel, and wherein the plurality of first direction pressure vessels are between the inlet and the outlet such that each of the plurality of first direction pressure vessels are in direct fluid communication with both of the inlet and the outlet of the single housing.

2. The gas turbine engine of claim 1, wherein the second direction pressure vessel is one of a plurality of second direction pressure vessels of the heat exchange manifold, wherein each of the plurality of second direction pressure vessels extends from the first direction pressure vessel in the reference plane, is in fluid communication with the first direction pressure vessel, and is in fluid communication with at least the one of the plurality of heat exchange members.

3. The gas turbine engine of claim 2, wherein the plurality of second direction pressure vessels are further in fluid communication with one another.

4. The gas turbine engine of claim 2, wherein the heat exchange manifold comprises a plurality of ribs extending between adjacent second direction pressure vessels of the plurality of second direction pressure vessels.

5. The gas turbine engine of claim 1, wherein the plurality of heat exchange members extend normal to the reference plane.

6. The gas turbine engine of claim 1, wherein each of the plurality of first direction pressure vessels is in parallel fluid communication with the thermal fluid member.

7. The gas turbine engine of claim 1, wherein the thermal fluid member is a thermal fluid source, and wherein the heat exchange manifold is an inlet heat exchange manifold configured to receive the flow of thermal fluid, and wherein the heat exchanger assembly further comprises an outlet heat exchange manifold positioned opposite the core section from the inlet heat exchange manifold.

8. The gas turbine engine of claim 1, wherein the heat exchange manifold is a monolithic component.

9. The gas turbine engine of claim 8, wherein the heat exchange manifold is formed through additive manufacturing.

10. The gas turbine engine of claim 1, wherein the heat exchange manifold is a high pressure thermal fluid manifold.

11. The gas turbine engine of claim 1, wherein the gas turbine engine defines an axial direction and a radial direction, wherein the gas turbine engine comprises an annular flowpath having an outer circumferential reference line along the radial direction at an axial location along the axial direction and an inner circumferential reference line along the radial direction at the axial location, and wherein the heat exchange manifold is positioned at least partially between the outer circumferential reference line and the inner circumferential reference line.

12. The gas turbine engine of claim 11, wherein the gas turbine engine defines a circumferential direction, and wherein the plurality of heat exchange members extend through the annular flowpath in the circumferential direction.

13. The gas turbine engine of claim 12, wherein the annular flowpath is a third stream of the gas turbine engine.

14. The gas turbine engine of claim 11, wherein the gas turbine engine further comprises a strut extending through the annular flowpath and having an aerodynamic surface exposed to the annular flowpath, wherein the heat exchange manifold is positioned inward of the aerodynamic surface of the strut.

15. The gas turbine engine of claim 1, wherein the first direction pressure vessel is a plenum extension, wherein the second direction pressure vessel is an offtake extension, wherein the offtake extension defines a plurality of apertures arranged lengthwise along the offtake extension, and wherein the plurality of apertures are fluidly coupled to the plurality of heat exchange members of the core section of the heat exchanger assembly.

16. The gas turbine engine of claim 1, wherein the gas turbine engine defines a radial direction and an axial direction, and wherein the reference plane extends in the radial direction and in the axial direction.

17. A thermal management system defining a reference plane, the thermal management system comprising:
a thermal fluid member having a flow of thermal fluid therethrough during operation; and
a heat exchanger assembly, the heat exchanger assembly comprising:
a core section comprising a plurality of heat exchange members; and
a heat exchange manifold comprising a first direction pressure vessel in fluid communication with the thermal fluid member and a second direction pressure vessel extending from the first direction pressure vessel, the first direction pressure vessel and the second direction pressure vessel each extending in the reference plane, the second direction pressure vessel in fluid communication with the first direction pressure vessel and with at least one of the plurality of heat exchange members, wherein the first direction pressure vessel includes a plurality of first direction pressure vessels wherein the heat exchange manifold defines a single housing including an inlet in direct fluid communication with the thermal fluid member and an outlet in direct fluid communication with the second direction pressure vessel, and wherein the plurality of first direction pressure vessels are between the inlet and the outlet such that each of the plurality of first direction pressure vessels are in direct fluid communication with both of the inlet and the outlet of the single housing.

18. The thermal management system of claim 17, wherein the second direction pressure vessel is one of a plurality of second direction pressure vessels of the heat exchange manifold, wherein each of the plurality of second direction pressure vessels extends from the first direction pressure vessel in the reference plane, is in fluid communication with the first direction pressure vessel, and is in fluid communication with at least the one of the plurality of heat exchange members.

19. The thermal management system of claim 18, wherein the plurality of second direction pressure vessels are further in fluid communication with one another.

20. The thermal management system of claim 18, wherein the heat exchange manifold comprises a plurality of ribs extending between adjacent second direction pressure vessels of the plurality of second direction pressure vessels.

* * * * *